United States Patent
Yu et al.

(10) Patent No.: US 12,405,880 B2
(45) Date of Patent: Sep. 2, 2025

(54) AUTOMATE LOAD TEST SCENARIO BASED ON MAPPING WITH REAL-TIME DATA MONITORING

(71) Applicant: MICRO FOCUS LLC, Santa Clara, CA (US)

(72) Inventors: Yan-Jun Yu, Shanghai (CN); Qian-Ru Zhai, Shanghai (CN); Ye Jiang, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 18/064,198

(22) Filed: Dec. 9, 2022

(65) Prior Publication Data

US 2024/0193075 A1     Jun. 13, 2024

(51) Int. Cl.
*G06F 9/44*        (2018.01)
*G06F 11/3668*    (2025.01)

(52) U.S. Cl.
CPC ........ *G06F 11/368* (2013.01); *G06F 11/3688* (2013.01)

(58) Field of Classification Search
CPC .................................................. G06F 11/368
USPC ......................................................... 717/124
See application file for complete search history.

(56) References Cited

U.S. PATENT DOCUMENTS

| | | | |
|---|---|---|---|
| 6,549,944 B1* | 4/2003 | Weinberg | G06Q 30/02 714/E11.181 |
| 7,516,042 B2 | 4/2009 | Glas | |
| 10,102,112 B2 | 10/2018 | Raghavan | |
| 10,509,718 B2* | 12/2019 | Venkatasubramanian | G06F 11/3664 |
| 11,113,762 B2* | 9/2021 | Smith | G06F 3/04847 |
| 11,755,463 B2* | 9/2023 | Mentre | G06F 11/3676 717/124 |
| 2007/0282556 A1* | 12/2007 | Achkar | G01R 31/318364 702/108 |
| 2012/0023485 A1* | 1/2012 | Dubey | G06F 8/30 717/125 |
| 2012/0192153 A1* | 7/2012 | Venkatraman | G06F 11/3672 717/124 |
| 2013/0086420 A1* | 4/2013 | Sgro | G06F 11/3692 714/E11.178 |
| 2022/0121560 A1* | 4/2022 | Tetreault | G06F 11/3664 |
| 2022/0138089 A1* | 5/2022 | Bekker-Vernik | G06F 11/3684 717/124 |
| 2023/0161690 A1* | 5/2023 | Shetty | G06F 11/302 717/124 |

FOREIGN PATENT DOCUMENTS

CA       3045375 A1 * 12/2019  ......... G06F 11/3664

* cited by examiner

*Primary Examiner* — Evral E Bodden
(74) *Attorney, Agent, or Firm* — Sheridan Ross P.C.

(57) ABSTRACT

Input data is received from an analysis of an application running in a real-world environment. The input data identifies one or more parameters that are associated with one or more test scripts that are used to test a new version of the application running in the real-world environment. One or more inputs are received that map the received input data to the one or more test scripts. The one or more test scripts are used to test the new version of the application. The one or more tests scripts are executed against the new version of the application based on the one or more parameters.

20 Claims, 5 Drawing Sheets

AUTOMATE LOAD TEST SCENARIO BASED ON MAPPING WITH REAL-TIME DATA MONITORING

FIELD

The disclosure relates generally to testing of software and particularly to testing of software using real-time data.

BACKGROUND

Typically, test engineers specify what load tests that are to be used when testing a software application. These may include features like, the number of virtual users and how they ramp up and/or down during the test period. One of the problems with the test engineers selecting the features of the load tests is that is does not always represent the real-word environment. In many instances, potential problems that still exist in the software application are not identified until the software application is placed in a real-world environment.

SUMMARY

These and other needs are addressed by the various embodiments and configurations of the present disclosure. The present disclosure can provide a number of advantages depending on the particular configuration. These and other advantages will be apparent from the disclosure contained herein.

Input data is received from an analysis of an application running in a real-world environment. The input data identifies one or more parameters that are associated with one or more test scripts that are used to test a new version of the application running in the real-world environment. One or more inputs are received that map the received input data to the one or more test scripts. The one or more test scripts are used to test the new version of the application. The one or more tests scripts are executed against the new version of the application based on the one or more parameters.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, radio frequency (RF), etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(1) and/or Section 112. Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
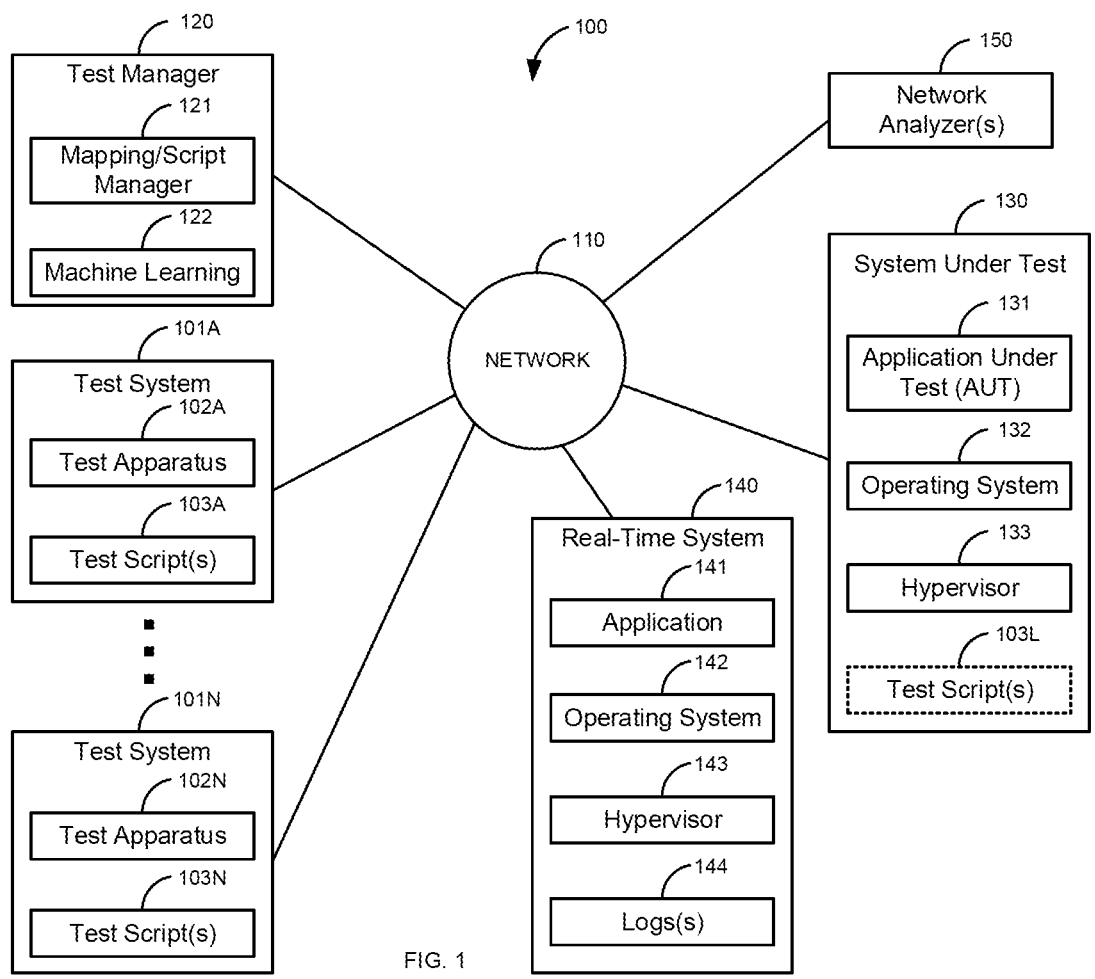
FIG. 1 is a block diagram of a first illustrative system for automating load testing using real-time data by mapping the real-time data to test scripts.

FIG. 1 is a block diagram of a first illustrative system 100 for automating load testing using real-time data by mapping the real-time data to test script(s) 103. The first illustrative system 100 comprises test systems 101A-101N, a network 110, a test manager 120, a system under test 130, a real-time system 140 and network analyzer(s) 150.

The test systems 101A-101N can be or may include any hardware coupled with software that can be used to administer the testing of the Application Under Test (AUT) 131 (e.g., a new version of the application 141), such as, a server, a personal computer, a gateway, a software testing apparatus, and/or the like. The test systems 101A-101N comprise test apparatuses 102A-102N, and test script(s) 103A-103N. There may be any number of test systems 101A-101N including a single test system 101.

The test apparatuses 102A-102N can be any hardware coupled with software that can be used to execute the test script(s) 103A-103N. The test apparatuses 102A-102N are controlled by the test manager 120/mapping/script manager 121.

The test script(s) 103A-103N may be various types of test script(s) 103A-103N, such as, virtual user tests, network traffic tests, connection test, vulnerability tests, load tests, memory tests, thread tests, user interface tests, denial-of-service tests, protocol tests, virtual machine tests, container tests, hypervisor tests, operating system tests, driver tests, database tests, security tests, and/or the like. The test script(s) 103A-103N may be on the test systems 101A-101N and/or may be local to the system under test 130 as indicated by the test script(s) 103L.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The test manager 120 is used to configure the test systems 101A-101N to execute the test scripts 103A-103N/103L against the AUT 131. Although shown as a separate from the test systems 101A-101N, the test manager 120 may reside in one or more of the test systems 101A-101N. For example, the test manager 120 may reside in the test system 101A. In one embodiment, the test manager 120 may reside in the system under test 130 or be distributed between the test systems 101A-101N/system under test 130.

Figure 3:
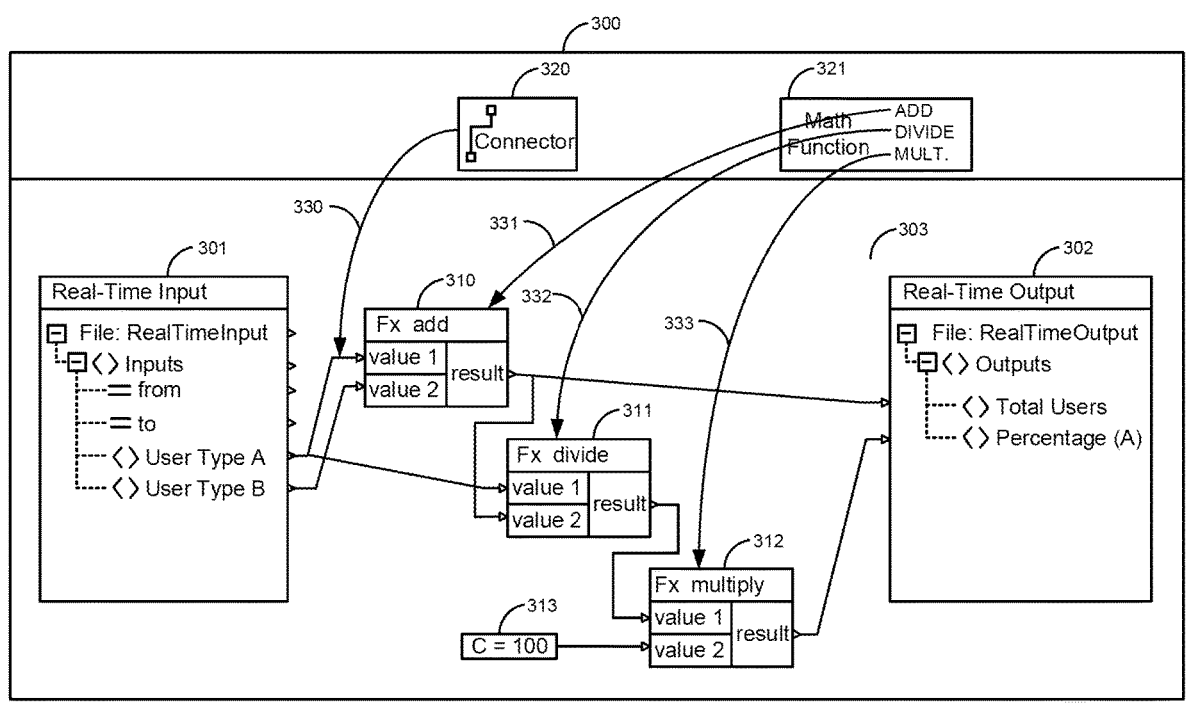
FIG. 3 is an exemplary user interface for mapping real-time data to test scripts.

The test manager 120 further comprises a mapping/script manager 121 and machine learning 122. The mapping/script manager 121 is used to control execution of the test scripts 103A-103N and/or 103L. The mapping/script manager 121 may get real-time data from the operating system 142, the hypervisor 143 the log(s) 144, the network analyzer(s) 150, and/or the like to define how specific test scripts 103A-103N/103L are executed against the AUT 131. The mapping/script manager 121 may have a user interface (e.g., as shown in FIG. 3) that allows a user to map real-time data/specific parameters that are used by the test scripts 103A-103N/103L.

The machine learning 122 may be any type of machine learning, such as, supervised machine learning, unsupervised machine learning, reinforcement machine learning, and/or the like. The machine learning 122 may be used to learn over time specific real-time data/parameters that can be as an input to the test scripts 103A-103N/103L. For example, the machine learning 122 may determine from user input that specific test parameters may relate to information in the logs 144.

The system under test 130 may be any hardware coupled with software that can host the AUT 131, such as, a web server, an application server, a communication server, a communication system, a database system, a security system, an embedded device, and/or the like. The system under test 130 further comprises the AUT 131, an operating system 132, a hypervisor 133, and optionally test scripts 103L.

The AUT 131 can be any type of application, such as, a financial application, a security application, a database application, an embedded application, a social network application, a banking application, a commercial application, a blog site, a gateway application, a security application, and/or the like. The AUT 131 test may comprise one or more applications, including a distributed application (e.g., a distributed database).

The operating system 132 may any existing operating system, such as Microsoft Windows®, Linux®, iOS®, Android®, an embedded operating system, a multitasking operating system, a time-sharing operating system, a batch operating system, and/or the like. The operating system is used to run the AUT 131.

The operating system 132 may run in a virtualized environment where a hypervisor 133 is used. For example, the hypervisor 133 may host a number of virtual machines/containers. The AUT 131 may reside in a virtual machine/container. The hypervisor 133 may be a Type 1 ("bare metal") or Type 2 ("hosted") hypervisor.

The test scripts 103L may be similar or different from the test scripts 103A-103N. For example, the test scripts 103L may exercise functionality in the AUT 131 that cannot be accessed by the test scripts 103A/103N.

The real-time system 140 is running an application 141. The real-time system 140 is running in a real-time environment. For example, the real-time system may be a live social network that has thousands of concurrent users. The real-time system 140 further comprises the application 141, an operating system 142, a hypervisor 143 (if a virtual environment is used), and logs 144.

The operating system 142 may be the same or different from the operating system 132. For example, the operating system 142 may be an earlier version of the Linux® operating system. Likewise, the hypervisor 143 may be the same or different from the hypervisor 133.

The log(s) 144 may be any log that can be generated for the application 141, such as, a system log, an application log, a thread log, a driver log (e.g., a network interface driver/backup driver), an operating system log, a hypervisor log, a virtual machine log, a container log, a memory usage log, a stack log, a heap log, and/or the like.

Figure 2:
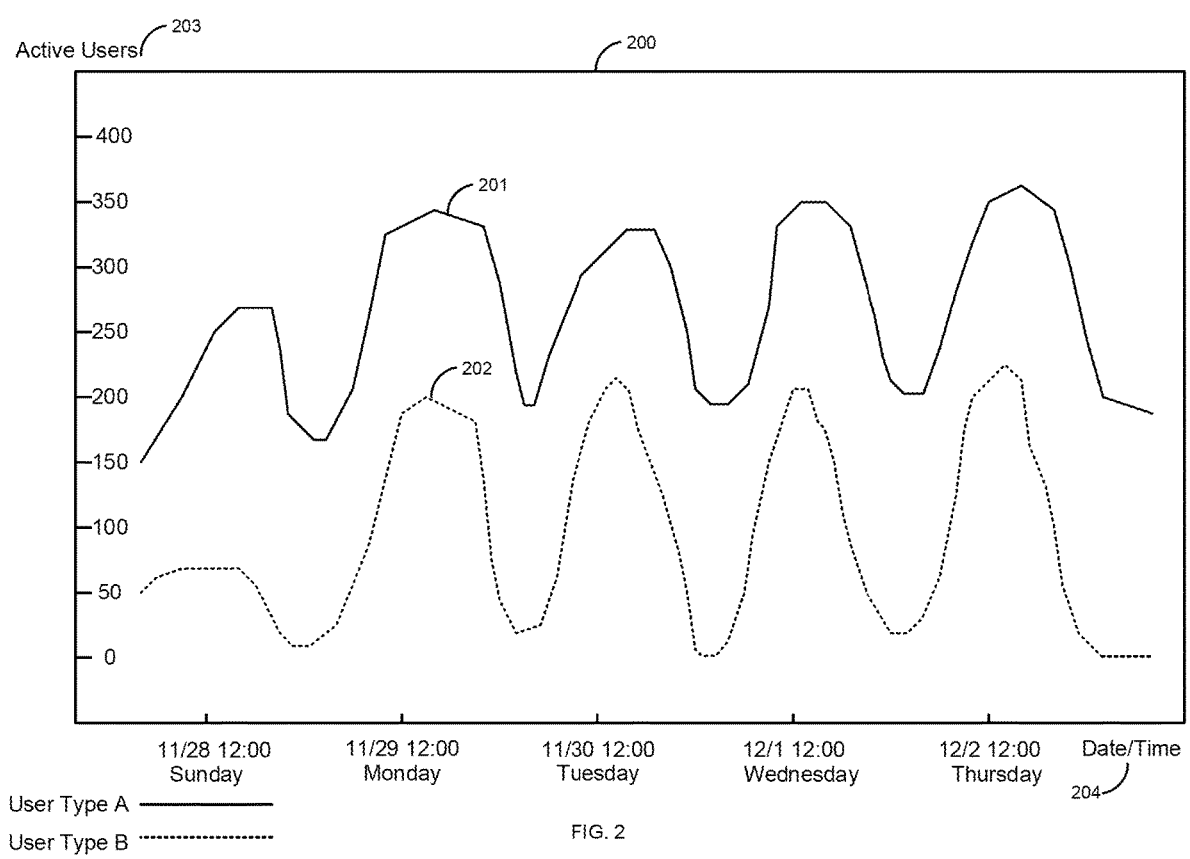
FIG. 2 is an exemplary graph of real-time user data for an application.

FIG. 2 is an exemplary graph of real-time user data 200 for the application 141. The graph of real-time user data 200 shows captured real-time data for two types of users: 1) Type A Users and Type B Users. For example, the Type A Users may be general users of a database application (141) and the Type B Users may be power users of the database application (141).

The graph of real-time user data 200 shows the number of real-time users 203 on the Y axis and the date/time 204 on the X axis. The Type A User graph line 201 shows the number of active Type A Users on the date Monday 11/28 (12:00 AM) to Thursday 12/2 (12:00 AM). The Type A User graph line 201 has a peak of 361 real-time users on Thursday 12/2 just after 12:00 and a low of 150 Type A Users just before Sunday 11/28 at 12:00 AM. The Type B User graph line 202 has a peak of 225 real-time users on Thursday 12/2 just after 12:00 and a low of 0 Type A Users before Wednesday 12/1 (12:00 AM) and after Thursday 12/2 (12:00 AM).

In the example of FIG. 2, the real-time users (either Type B or Type A) are at sample periods. For example, the sample period may be every five minutes. The real-time data (parameters) may be captured from the log(s) 144.

FIG. 3 is an exemplary user interface 300 for mapping real-time data to test scripts 103. The user interface 300 of FIG. 3 is based on the real-time data from the graph of the real-time user data 200 in FIG. 2, which has real-time data for the Type A/Type B Users.

In the past, a test engineer would typically define the input to the test scripts 103. For example, the test engineer, based on previous experience, may define the total number of virtual users for the test scripts 103 as 250 for the Type A User and 100 for the Type B User. While this estimated value may identify some of the problems of the AUT 131, these static numbers fail to represent what is happening in the real world. As shown the graph of real-time user data 200 the number of Type A/Type B Users dramatically varies not only based on the time of day, but also varies depending on the particular day. For example, during the hours from 8:00 AM to 4:00 PM on Monday-Friday, the number of Type A/Type B Users is much higher. In addition, the number of Type A/Type B Users is significantly lower on the weekend. Just selecting 350 total users would simply miss the peak periods when the total number of Type A/Type B Users is over 550 users and the low is around 160 total users. Not capturing how the AUT 131 will actually work in real world conditions may cause the test scripts 103 to miss potential problems in the AUT 131.

By capturing the real-time data associated with the Type A/Type B Users, these parameters can be mapped as an input for the test scripts 103. The mapping/script manager 121 gathers the relevant real-time data/parameters. In FIG. 3, the data is stored as Extensible Markup Language (XML) in the file RealTimeInput.xml. As the mapping/script manager 121 parses the RealTimeInput.xml file, it identifies the relevant data associated with the Type A/Type Users (e.g., samples of the number of users over ten minutes intervals that are captured in the log(s) 144 over a week period).

The mapping/script manager 121 displays the user interface 300 to the user. In FIG. 3, the user interface 300 comprises a real-time input box 301, a real-time output box 302, a connection area 303, an add function box 310, a divide function box 311, a multiply function box 312, an add connector box 320, and an add mathematical function box 321.

Initially the user interface 300 shows the real-time input box 301 and the real-time output box 302. The user can then map specific real-time parameters to specific test parameters that are used by the test scripts 103. In addition, the user can associate mathematical functions 310/311/312 with specific test parameters.

For example, as shown in steps 331, 332, and 333, the user can select a specific mathematical function in the mathematical function box 321 and drag the add function box 310, the divide function box 311, and the multiply function box 312 into the connection area 303. The user then uses the connector box 320 to make connections with the function boxes 310, 311, and 312 as shown in FIG. 3. For example, the user creates the connection from the Type A user connection to the add function value 1 connector as shown in step 330. A similar process is used to connect the Type B user connection to the value 2 connection on the add function box 310. The result of the add function box 310 is connected to the total users connection in the real-time output box 302. The add function box 310 result provides a total number of virtual users for the test scripts 103. For example, using the graph of real-time user data 200 the maximum total users would around 580 users.

A similar process is used to calculate a percentage of Type A users. The result of the add function box 310 is connected to the to the value 2 connector of the divide function box 311. The Type A user connection is connected to the value 1 connector of the divide function box 311. The result of the divide function box 311 is connected to the value 1 connector of the multiply function box 312. A fixed value (100) is connected to the value 2 connector of the multiply function box 312. The result of the multiply function box 312 is connected to the percentage of Type A users connector. This produces the actual percentage of Type A users in the test scripts 103. A similar process may be used to associate the number of users versus time periods. This information can be stored in the real-time input.xml file as a series of samples that can be feed into the period test in the real-time output box 302.

While FIG. 3 is an exemplary example, the types of parameters that can be used as an input to the test scripts 103 may include various types of parameters, such as, a number of virtual users, a time period, a change of the virtual users over the time period, a number of virtual users in the time period, a number of windows, a number of windows for the number of virtual users, a number of windows within the time period, a number of windows for the number of virtual users within the time period, a number of sockets used, a number of connections, a number of packets per second, a number of virtual machines, a number of containers, a number of threads, and/or the like.

In FIG. 3, the mapping may be manually defined for each test script 103. This information can then be stored and repeated for different tests scripts 103. For example, a number of open windows tests may be defined by the user and later the test scripts 103 are executed in conjunction with the virtual users test that were defined in FIG. 3.

Figure 4:
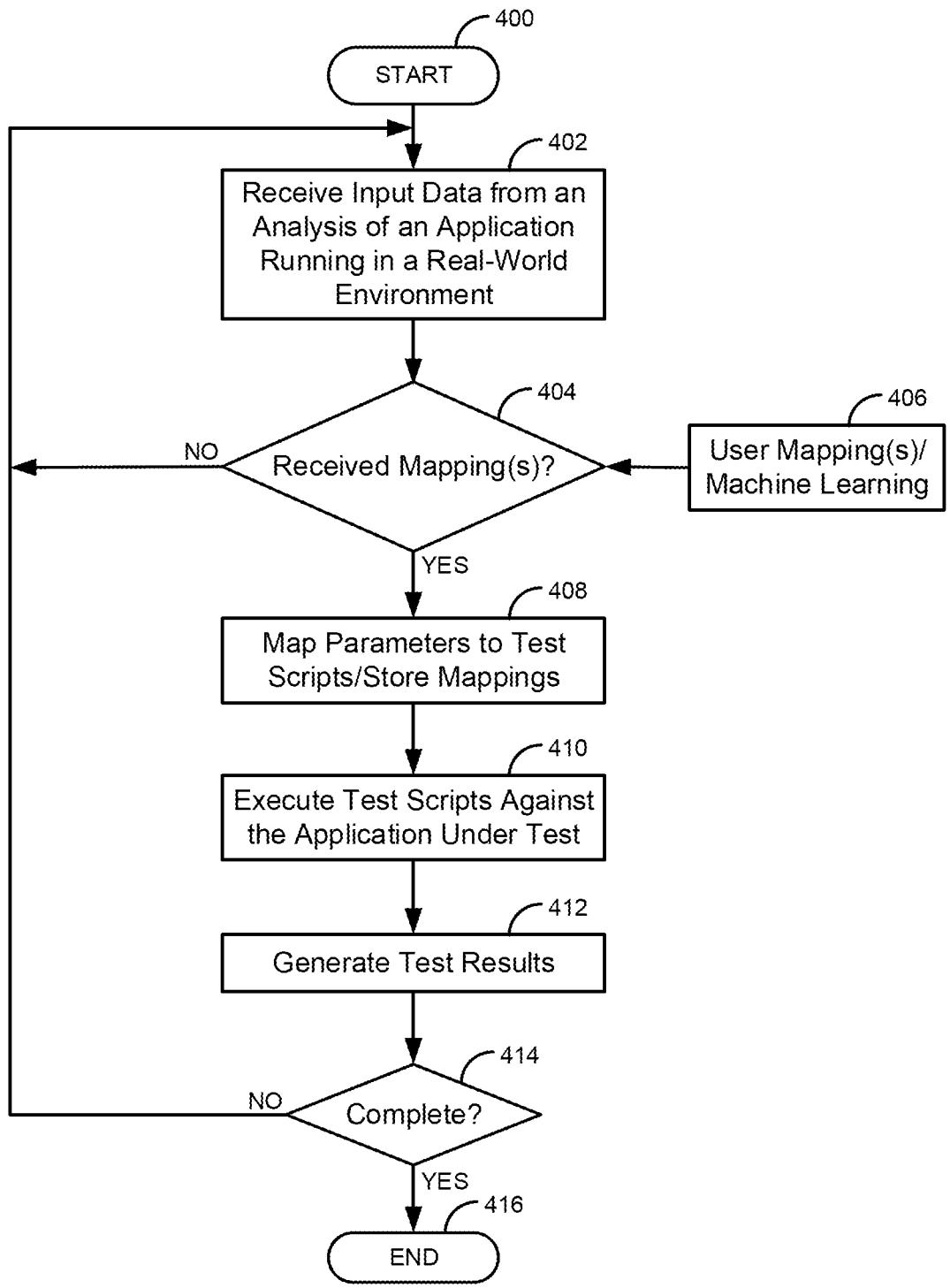
FIG. 4 is a flow diagram of a process for automating load testing using real-time data by mapping the real-time data to test scripts.
Figure 5:
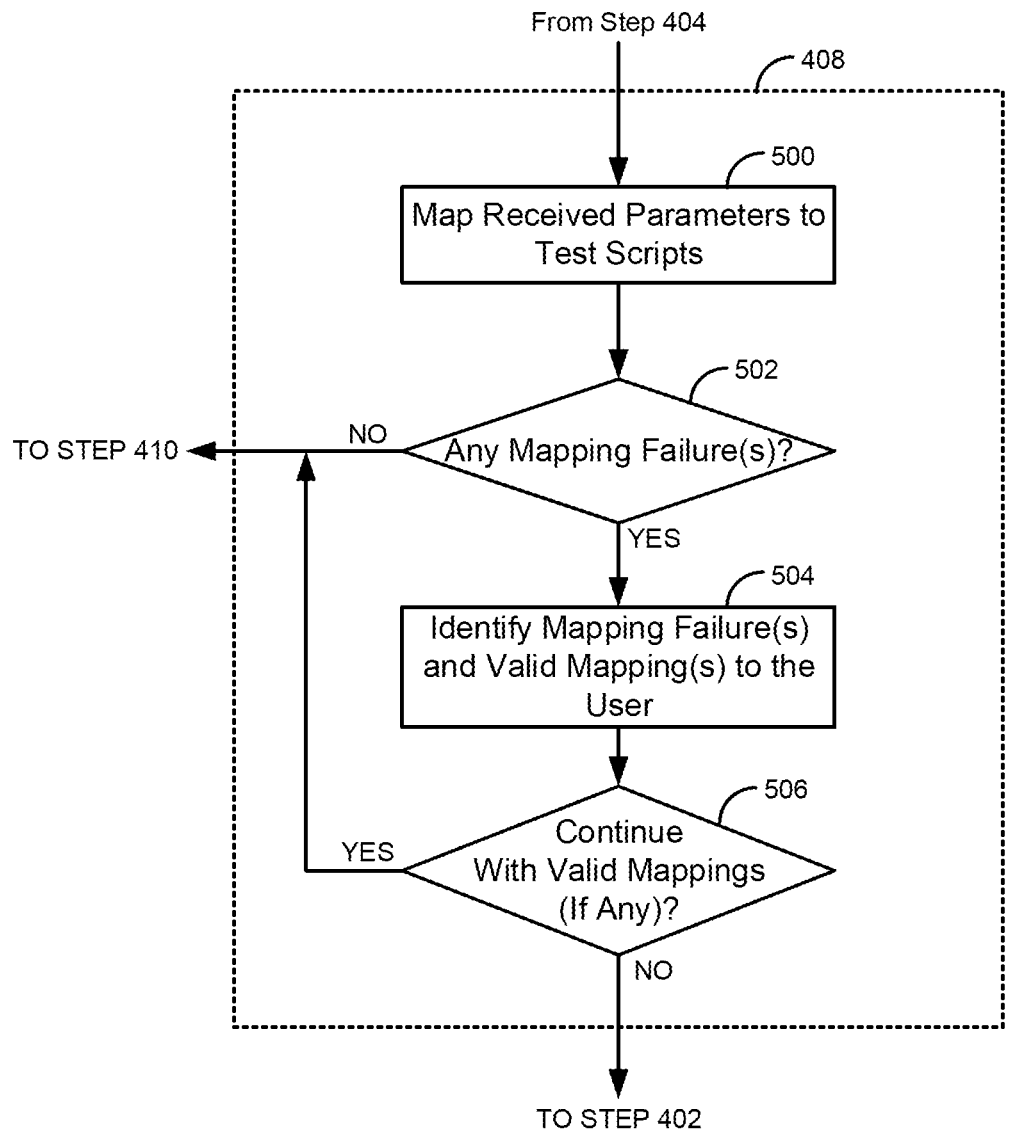
FIG. 5 is a flow diagram of a process for validating mappings.

FIG. 4 is a flow diagram of a process for automating load testing using real-time data by mapping the real-time data to the test scripts 103. Illustratively, the test systems 101A-101N, the test apparatuses 102A-102N, the test scripts 103A-103N/103L, the test manager 120, the mapping/script manager 121, the machine learning 122, the system under test 130, the AUT 131, the operating system 132, the hypervisor 133, the real-time system 140, the application 141, the operating system 142, the hypervisor 143, and the network analyzers 150 are stored-program-controlled entities, such as a computer or microprocessor, which performs the method of FIGS. 4-5 and the processes described herein by executing program instructions stored in a computer readable storage medium, such as a memory (i.e., a computer memory, a hard disk, and/or the like). Although the methods described in FIGS. 4-5 are shown in a specific order, one of skill in the art would recognize that the steps in FIGS. 4-5 may be implemented in different orders and/or be implemented in a multi-threaded environment. Moreover, various steps may be omitted or added based on implementation.

The process starts in step 400. The mapping/script manager 121 receives input data from an analysis of the application 141 (an application 141 running in the real-world) in step 402. The mapping/script manager 121 determines, in step 404, if any user mappings/machine learning mappings (from step 406) have been received. For example, the number of virtual users may have been provided as described in FIG. 3. If there were not any mappings received in step 404, the process goes back to step 402.

Otherwise, if the mappings have been received in step 404, the mapping/script manager 121 maps the parameters to the test scripts 103 in step 408. The mappings are also stored in step 408. The mapping/script manager 121 executes the test scripts 103 against the AUT 131 in step 410. The test scripts 103 generate the test results in step 412.

The mapping/script manager 121 determines, in step 414, if the process is complete. If the process is complete in step 414, the process ends in step 416. Otherwise, if the process is not complete in step 414, the process goes back to step 402.

In one embodiment, input data may be captured in real-time and the test scripts 103 are also executed in real-time or semi real-time. For example, the input data is read from the logs 144 in real-time and automatically mapped to the test scripts in real-time. In other words, the test environment is concurrently simulating the real-time system 140. The automatic mapping may be based on user defined mappings and/or the machine learning 122.

FIG. 5 is a flow diagram of a process for validating mappings. FIG. 5 is an exemplary embodiment of step 408 of FIG. 4. After receiving the mappings in step 404, mapping/script manager 121 maps the received parameters to the test scripts 103 in step 500. The mapping/script manager 121 determines, in step 502, if there are any mapping failures (e.g., incomplete or invalid mappings). For example, a failure may be where the user connects a sampled number of windows for a virtual user a number of connections parameter. If there are not any mapping failures in step 502, the process goes to step 410 where the test scripts 103 are executed against the AUT 131.

If there are any mapping failures in step 502, the mapping/script manager 121 identifies the mapping failure(s)/valid mappings to the user. For example, if the user tries to make an invalid connection, the user interface 300 may display an error message to the user. The user may decide whether to continue with the just valid mappings in step 506. If so, the process goes to step 410, and the invalid mappings will be ignored. Otherwise, if the user does not want to continue with the invalid valid mappings in step 506, the process goes back to step 402 where the user may change the mappings.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an Application-Specific Integrated Circuit (ASIC) or other integrated circuit, a digital signal processor, a hard-wired electronic or logic circuit such as discrete element circuit, a programmable logic device or gate array such as a Programmable Logic Device (PLD), Programmable Logic Array (PLA), Field-Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:
1. A system comprising:
a microprocessor; and
a computer readable medium, coupled with the microprocessor and comprising microprocessor readable and executable instructions causing the microprocessor to:
receive input data, wherein the input data is received from an analysis of an application running in a real-world environment, and wherein the input data identifies one or more parameters that are associated with one or more test scripts that are used to test a new version of the application running in the real-world environment;

receive one or more inputs mapping the received input data to the one or more test scripts, wherein the one or more test scripts are used to test the new version of the application, and wherein the mapping further comprises one or more defined mathematical functions, based on an Extensible Markup Language (XML), that are used to map the one or more parameters to the one or more test scripts; and execute the one or more test scripts against the new version of the application based on the one or more parameters.

2. The system of claim 1, wherein the mapping of the received input data to the one or more test scripts is based on a user mapping the received input data to the one or more test scripts.

3. The system of claim 2, wherein mapping the received input data to the one or more test scripts is based on a graphical user interface that allows the user to map the received input data to the one or more test scripts.

4. The system of claim 1, wherein the microprocessor readable and executable instructions further comprise instructions to:

determine if the mapping is incomplete or invalid; and in response to the mapping being incomplete or invalid, causing an error message to be displayed that the mappings are incomplete or invalid.

5. The system of claim 1, wherein the mapping the received input data to the one or more test scripts is based on machine learning.

6. The system of claim 1, wherein the one or more parameters comprises at least one of: a number of virtual users, a time period, a change of number of virtual users over the time period, a number of windows, the number of windows for the number of virtual users, the number of windows within the time period, the number of windows for the number of virtual users within the time period, a number of sockets used, a number of connections, a number of packets per second, a number of virtual machines, a number of containers, and a number of threads.

7. The system of claim 1, wherein the input data is captured from one or more of a system log, an application log, a thread log, a driver log, an operating system log, a hypervisor log, a virtual machine log, a container log, a memory usage log, a stack log, a heap log, and a network analyzer.

8. The system of claim 1, wherein the input data is captured in real-time and the one or more test scripts are executed concurrently in real-time or semi-real-time.

9. A method comprising:

receiving, by a microprocessor, input data, wherein the input data is received from an analysis of an application running in a real-world environment, and wherein the input data identifies one or more parameters that are associated with one or more test scripts that are used to test a new version of the application running in the real-world environment;

receiving, by the microprocessor, one or more inputs mapping the received input data to the one or more test scripts, wherein the one or more test scripts are used to test the new version of the application, and wherein the mapping further comprises one or more defined mathematical functions, based on an Extensible Markup Language (XML), that are used to map the one or more parameters to the one or more test scripts; and executing, by the microprocessor, the one or more test scripts against the new version of the application based on the one or more parameters.

10. The method of claim 9, wherein the mapping of the received input data to the one or more test scripts is based on a user mapping the received input data to the one or more test scripts.

11. The method of claim 10, wherein mapping the received input data to the one or more test scripts is based on a graphical user interface that allows the user to map the received input data to the one or more test scripts.

12. The method of claim 9, further comprising:

determining if the mapping is incomplete or invalid; and in response to the mapping being incomplete or invalid, causing an error message to be displayed that the mappings are incomplete or invalid.

13. The method of claim 9, wherein the mapping the received input data to the one or more test scripts is based on machine learning.

14. The method of claim 9, wherein the one or more parameters comprises at least one of: a number of virtual users, a time period, a change of number of virtual users over the time period, a number of windows, the number of windows for the number of virtual users, the number of windows within the time period, the number of windows for the number of virtual users within the time period, a number of sockets used, a number of connections, a number of packets per second, a number of virtual machines, a number of containers, and a number of threads.

15. The method of claim 9, wherein the input data is captured in real-time and the one or more test scripts are executed concurrently in real-time or semi-real-time.

16. A non-transient computer readable medium having stored thereon instructions that cause a processor to execute a method, the method comprising instructions to:

receive input data, wherein the input data is received from an analysis of an application running in a real-world environment, and wherein the input data identifies one or more parameters that are associated with one or more test scripts that are used to test a new version of the application running in the real-world environment;

receive one or more inputs mapping the received input data to the one or more test scripts, wherein the one or more test scripts are used to test the new version of the application, and wherein the mapping further comprises one or more defined mathematical functions, based on an Extensible Markup Language (XML), that are used to map the one or more parameters to the one or more test scripts; and execute the one or more test scripts against the new version of the application based on the one or more parameters.

17. The non-transient computer readable medium of claim 16, wherein the mapping of the received input data to the one or more test scripts is based on a user mapping the received input data to the one or more test scripts.

18. The non-transient computer readable medium of claim 17, wherein mapping the received input data to the one or more test scripts is based on a graphical user interface that allows the user to map the received input data to the one or more test scripts.

19. The non-transient computer readable medium of claim 16, wherein the mapping the received input data to the one or more test scripts is based on machine learning.

20. The non-transient computer readable medium of claim 16, wherein the one or more parameters comprises at least one of: a number of virtual users, a time period, a change of number of virtual users over the time period, a number of windows, the number of windows for the number of virtual users, the number of windows within the time period, the number of windows for the number of virtual users within the time period, a number of sockets used, a number of connections, a number of packets per second, a number of virtual machines, a number of containers, and a number of threads.

\* \* \* \* \*